United States Patent
Fremerey et al.

(10) Patent No.: US 12,366,864 B2
(45) Date of Patent: Jul. 22, 2025

(54) CLEANING SYSTEM COMPRISING A SELF-DRIVING CLEANING ROBOT AND A CHARGING STATION, AND METHOD FOR MOVING THE CLEANING ROBOT TO THE CHARGING STATION

(71) Applicant: BSH Hausgeräte GmbH, Munich (DE)

(72) Inventors: Maximilian Fremerey, Saal an der Saale (DE); Sandeep Bairampalli, Bangalore (IN); Ganesh Nithin, Bangalore (IN); Pratip Ghosh, Bangalore (IN)

(73) Assignee: BSH Hausgeräte GmbH, Munich (DE)

( * ) Notice: Subject to any disclaimer, the term of this patent is extended or adjusted under 35 U.S.C. 154(b) by 283 days.

(21) Appl. No.: 18/040,676

(22) PCT Filed: Jul. 20, 2021

(86) PCT No.: PCT/EP2021/070253
§ 371 (c)(1),
(2) Date: Feb. 6, 2023

(87) PCT Pub. No.: WO2022/028877
PCT Pub. Date: Feb. 10, 2022

(65) Prior Publication Data
US 2023/0315116 A1 Oct. 5, 2023

(30) Foreign Application Priority Data
Aug. 5, 2020 (DE) ............. 10 2020 209 841.7

(51) Int. Cl.
*G05D 1/02* (2020.01)
*G05D 1/00* (2006.01)

(52) U.S. Cl.
CPC ......... *G05D 1/0225* (2013.01); *G05D 1/0234* (2013.01); *G05D 1/0246* (2013.01)

(58) Field of Classification Search
CPC ... G05D 1/0225; G05D 1/0234; G05D 1/0246
USPC ........................................................ 700/245
See application file for complete search history.

(56) References Cited

U.S. PATENT DOCUMENTS

| 8,749,196 B2 | 6/2014 | Cohen et al. |
| 11,865,937 B2 * | 1/2024 | Sun ................... B60L 53/37 |
| 2014/0100693 A1 | 4/2014 | Fong et al. |
| 2016/0091889 A1 | 3/2016 | Nakajima et al. |

(Continued)

FOREIGN PATENT DOCUMENTS

EP 3185096 A1 6/2017

*Primary Examiner* — Kira Nguyen
(74) *Attorney, Agent, or Firm* — Laurence A. Greenberg; Werner H. Stemer; Ralph E. Locher

(57) ABSTRACT

A cleaning system includes a self-driving cleaning robot and a charging station with a reference marker. The cleaning robot has an optical detection unit by way of which it detects the reference marker. The cleaning robot has a computing unit that is connected for communication purposes to the detection unit and a control unit for controlling the cleaning robot. The computing unit controls the approach of the cleaning robot to the charging station in a distance-dependent and in a detection-dependent manner using a histogram of oriented gradients and using the reference marker. A HOG method and a reference marker method can thus be used in combination for improved navigation.

9 Claims, 2 Drawing Sheets

(56) References Cited

U.S. PATENT DOCUMENTS

| | | | |
|---|---|---|---|
| 2016/0091899 A1* | 3/2016 | Aldred | B25J 5/00 |
| | | | 901/1 |
| 2016/0318415 A1 | 11/2016 | Salasoo | |
| 2018/0052468 A1* | 2/2018 | Choe | G05D 1/0274 |
| 2019/0179333 A1* | 6/2019 | Noh | B25J 9/16 |
| 2020/0077859 A1* | 3/2020 | Nien | A47L 9/2873 |
| 2020/0387165 A1* | 12/2020 | Wang | B25J 11/0085 |

* cited by examiner

CLEANING SYSTEM COMPRISING A SELF-DRIVING CLEANING ROBOT AND A CHARGING STATION, AND METHOD FOR MOVING THE CLEANING ROBOT TO THE CHARGING STATION

FIELD AND BACKGROUND OF THE INVENTION

The present invention relates to a cleaning system having a self-driving cleaning robot and a charging station. Furthermore, the invention relates to a method for moving a self-driving cleaning robot towards a charging station of such a cleaning system.

Known cleaning systems usually have a self-driving, in other words autonomous, cleaning robot, by way of example a vacuum cleaner robot, and a charging station and the cleaning robot temporarily moves into or docks with said charging station in order to charge its rechargeable battery.

US 2016/0091899 A1 discloses a generic cleaning system having a self-driving cleaning robot and a charging station for charging a rechargeable battery of the cleaning robot, wherein the charging station has visibly arranged reference markers and the cleaning robot has an optical detecting facility by way of which it can detect these reference markers. The cleaning robot likewise has a computing facility which is connected in a communicating manner to the detecting facility and to a control facility so as to control a moving process of the cleaning robot, by way of example a drive, and said computing facility is able to receive an image of two reference markers which is provided by the optical detecting facility and to control the control facility or drive system of the cleaning robot in such a manner that, on the basis of a difference between the illustration of two reference markers in the received image and a pre-determined relative distance between the first and second reference markers, said cleaning robot drives to the charging station. The charging station is subsequently activated by way of a camera-based detecting facility so as to detect two reference markers.

EP 3 185 096 A1 discloses a charging station for an autonomous cleaning apparatus which comprises a station body having an energy supply interface. The energy supply interface is arranged on a side surface of the station body in order to supply the autonomous cleaning apparatus with energy. Furthermore, an identification structure is provided which is likewise arranged on the side surface of the station body and which renders it possible to detect a position of the energy supply interface by a detecting facility on the autonomous cleaning apparatus and to steer the autonomous cleaning apparatus accordingly. The identification structure comprises in this case at least one protrusion and at least one indentation which form a surface structure that in the case of an incidence of light allows a different intensity of reflected light and as a result renders identification possible. It is hereby likewise possible to steer the autonomous cleaning apparatus, for example a self-driving cleaning robot, towards the charging station.

U.S. Pat. No. 8,749,196 B2 discloses a combination of an autonomous robot, a charging station and a navigation control system so as to control the movement and the operation of the robot. In this case, a signal emitter is provided at the charging station so as to project a signal to the robot. The latter has at least one signal detector, which is designed so as to detect at least one infrared docking signal that is projected by the emitter of the charging station, wherein for this purpose room mapping programs using the charging station and/or walls and large objects as reference points are used.

A disadvantage in the case of the cleaning systems or charging stations known from the prior art is that these are not only of a comparatively large construction and are technically complex and consequently expensive but in addition problems also arise in the case of a cleaning robot locating the charging station if there is no visual connection or signal connection between the cleaning robot and the charging station.

SUMMARY OF THE INVENTION

The object of the present invention is therefore to specify for a cleaning system of the generic type an improved embodiment or at least one alternative embodiment which overcomes in particular the disadvantages that are known from the prior art and which in particular renders it possible to improve the manner in which an autonomous cleaning robot locates a charging station.

This object is achieved in accordance with the invention by the subject matter. Advantageous embodiments are the subject matter of the dependent claims.

The present invention is based on the general idea of specifying a cleaning system having a charging station and an autonomous, in other words self-driving, cleaning robot, which so as to independently locate the charging station uses two different methods, namely a so-called HOG method (histogram of oriented gradients) and a reference marker method (fiducial marker). The cleaning system in accordance with the invention consequently first combines these two methods, whereby the great advantage is achieved that the charging station can be constructed in a more compact and less conspicuous manner and the cleaning robot also locates the charging station if said cleaning robot is so far away from said charging station, by way of example in a different room of a home to be cleaned, that there is no direct visual contact with the charging station and consequently no direct signal connection. The cleaning system in accordance with the invention consequently has the previously described self-driving cleaning robot and the charging station for charging a rechargeable battery of the cleaning robot, wherein the charging station has a visibly arranged reference marker and the cleaning robot has an optical detecting facility by way of which it can detect the reference marker on the charging station and an environment. In addition, the cleaning robot in accordance with the invention has a computing facility, by way of example a microprocessor, which is connected in a communicating manner to the detecting facility and a control facility so as to control a drive process of the cleaning robot. The control facility comprises in this case preferably also a drive facility by way of which the cleaning robot is driven. As an alternative, it is naturally also conceivable that the control facility is only connected to the drive facility in a communicating manner. In accordance with the invention, the computing facility is now designed in such a manner that it controls a moving process of the cleaning robot towards the charging station by way of the previously described HOG method (histogram of oriented gradients) if a distance between the cleaning robot and the charging station is greater than a pre-defined distance or the detecting facility of the cleaning robot does not detect the reference marker. This is by way of example the case if the cleaning robot is located so far away from its charging station that its optical detecting facility cannot clearly recognize the reference marker on the charging station. This state is conceivable in the case of distances greater than 3 meters between the charging station and the cleaning robot since it is difficult in this case for the optical detecting facility on the cleaning robot to detect the reference marker. Furthermore, the computing facility in accordance with the invention is designed in such a manner that it controls a moving process of the cleaning robot towards the charging station by way of the reference markers if a distance between the cleaning robot and the charging station is less than or equal to a pre-defined distance or the detecting facility of the cleaning robot detects the reference marker. Consequently, if the cleaning robot is located in closer proximity to the charging station then said cleaning robot can move towards said charging station exclusively by way of the reference marker method, whereas if a distance between the charging station and the cleaning robot is greater the cleaning system in accordance with the invention initially uses the HOG method until the cleaning robot has moved so close to the charging station that further navigation is possible by way of the reference marker on the charging station. The cleaning system in accordance with the invention consequently first combines two different navigation methods so as to move a cleaning robot towards an associated charging station and as a consequence renders possible a charging station which is less complex in terms of design and is smaller. In addition, it is possible by way of the HOG method to implement a self-learning effect which renders it possible for the charging station to be located at different angles, lighting conditions and distances to said charging station.

In an expedient manner, the reference marker has at least two images and/or shapes. The two images or shapes can be arranged in this case at a pre-defined distance with respect to one another and form edges, lines or points that can be clearly identified by the optical detecting facility of the cleaning robot and can be converted by the computing facility into corresponding control commands to the control facility or a drive facility of the cleaning robot. The reference markers or their images and/or shapes are designed in this case in such a manner that the fixed points or lines that are required for navigation can be clearly and easily detected by the detecting facility. The reference markers having their individual points are then overlaid with an image that is detected by the detecting facility and used as a measurement unit or reference point.

In an expedient manner, the reference marker has three rectangles which are arranged adjacent to one another and of which the middle rectangle has a different color and/or shape than the two lateral rectangles. In this case, it is in particular conceivable that the middle rectangle is 7.5 cm high and 8 cm wide, whereas the two lateral rectangles are each squares with sides 7.5 cm long. It is hereby possible to use a total of eight fixed points on the reference marker, namely the respective corner points of the square rectangle, for navigation. In order to facilitate locating or detecting these reference markers, the middle rectangle can also be white, whereas the two lateral rectangles are red. The respective corner points of the lateral rectangles are hereby highlighted in color.

In the case of a further advantageous embodiment of the solution in accordance with the invention, the pre-defined distance d is approx. 3 meters. During the development of the invention, it has been shown that a maximum distance for reliably detecting the reference marker or for reliably navigating the cleaning robot to the charging station is approx. 3 meters. Within this distance d, the optical detecting facility, by way of example a USB camera, is able to recognize in a problem-free manner the individual fixed points or lines/edges of the reference marker and solely by way thereof move towards the charging station. In the case of a distance d that is greater than 3 meters, it is possible under certain circumstances for problems to occur with the result that in this event in the case of the present invention the HOG method in accordance with the invention is used. It is possible by way of the HOG method to create a feature classifier which is designed so as to recognize objects in the image processing and as a result generates a so-called region of interest (ROI) that comprises the reference markers. The greatest challenge in the case of creating a feature classifier of this type is that it has to cope with variations with respect to illumination, position and masking of the charging station in the image. In order to achieve this, it is necessary to train the classifier, by way of example with different orientations, backgrounds, illumination situations and different markings of the charging station.

The present invention is further based on the general idea of specifying a method for moving a self-driving cleaning robot to a charging station of a cleaning system that is described in the previous paragraphs, wherein the computing facility controls a moving process of the cleaning robot towards the charging station by way of a histogram of oriented gradients (HOG) if a distance between the cleaning robot and the charging station is greater than a pre-defined distance d or the detection facility of the cleaning robot does not detect the reference marker. If a distance between the cleaning robot and the charging station is smaller than or equal to the pre-defined distance d or the detecting facility of the cleaning robot detects the reference marker by means of the optical detecting facility, in the case of the method using detecting facilities the moving process of the cleaning robot towards the charging station is controlled by way of the reference marker. The method in accordance with the invention consequently uses detection-dependent and distance-dependent different navigation methods, namely in the first instance the reference marker method and in the second instance the HOG method. It is consequently possible by means of the method in accordance with the invention to specify the charging station being located in a precise and reliable manner which is simultaneously cost-effective and which renders it possible to map the charging station in a space-optimized and cost-effective manner.

In an expedient manner, the computing facility calculates a distance d, coordinates and an angle $\alpha$ of the cleaning robot with respect to a middle point of the reference marker if the detecting facility detects the reference marker. This can be performed by way of example by overlaying the image that is detected by the detecting facility with the reference marker that is contained therein. By way of the distance d, the coordinates and the angle $\alpha$ and the middle point of the reference marker that is calculated therefrom, it is possible to steer the cleaning robot towards the charging station in a purposeful manner by way of the computing facility and the control facility that is connected thereto in a communicating manner.

In an expedient manner, in the case of an angle $\alpha \leq 10$ degrees the computing facility steers the cleaning robot directly to the charging station since an optimum occurs in this range with respect to d between the cleaning robot and the charging station. While the cleaning robot is moving towards the charging station, a regulator, for example a proportional regulator, ensures that appropriate corrective measures are undertaken in the case of deviations from the center of the reference marker that is detected in the previous paragraph. This is in response to any inaccuracies that may occur in the estimation of the position of the robot as a result of measurement errors of the odometry sensors. It is hereby possible to steer the cleaning robot towards the charging station in a purposeful manner.

The following further advantageous embodiment of the method in accordance with the invention for locating the charging station is provided for angles α that are greater than 10 degrees: in the case of an angle α≤10 degrees the computing facility initially initiates a rotation of the cleaning robot in an anti-clockwise direction by an angle β=(90 degrees−α) and subsequently moves said cleaning robot over a distance $d_1=d \times \cos(\beta)$. If the cleaning robot moves over the distance $d_1$, the computing facility initiates by way of the control facility a further rotation of the cleaning robot by an angle of 90 degrees in the clockwise direction and subsequently moves it over a distance $d_2=d \times \sin(\beta)$. After traveling the distance $d_2$, the cleaning robot generally arrives at a more advantageous position with respect to the charging station with the result that said charging station can now be located more precisely using the method described above.

In the case of a further advantageous embodiment of the method in accordance with the invention, the computing facility moves the cleaning robot back if its distance d to the charging station is less than 100 cm and simultaneously the angle α is greater than 10 degrees. In the case of a distance d that is less than 100 cm and an angle α less than 10 degrees, the cleaning robot can drive directly to the charging station whereas in the case of an angle α>10 degrees said cleaning robot initially rotates in an anti-clockwise direction, travels over the distance $d_1$ and subsequently rotates in the clockwise direction and travels over the distance $d_2$ according to the previous paragraph. All in all, it is possible using the method in accordance with the invention to locate the charging station in a comparatively simple and yet reliable manner.

Further important features and advantages of the invention are disclosed in the subordinate claims, the drawings and the associated description of the FIGS. with the aid of the drawings.

It is understood that the features that are mentioned above and are still to be explained below cannot only be used in the respective disclosed combination but rather can also be used in different combinations or as standalone without leaving the scope of the present invention.

Preferred exemplary embodiments of the invention are illustrated in the drawings and are explained in detail in the description below, wherein like reference characters refer to like or similar or like functioning components.

DETAILED DESCRIPTION OF THE INVENTION

Figure 1:
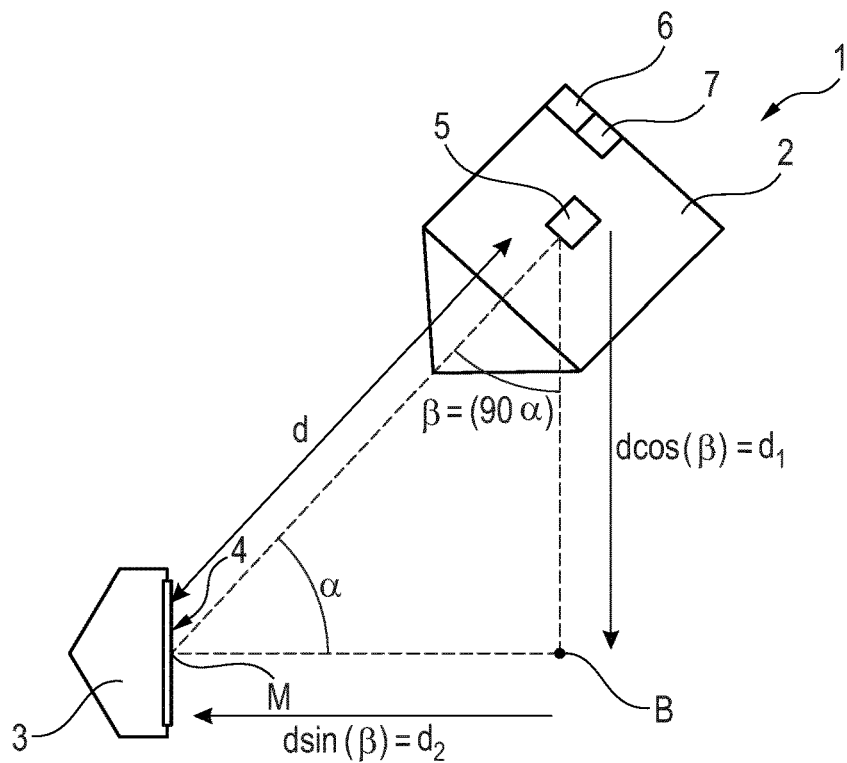
FIG. 1 shows schematically a cleaning system in accordance with the invention.
Figure 2:
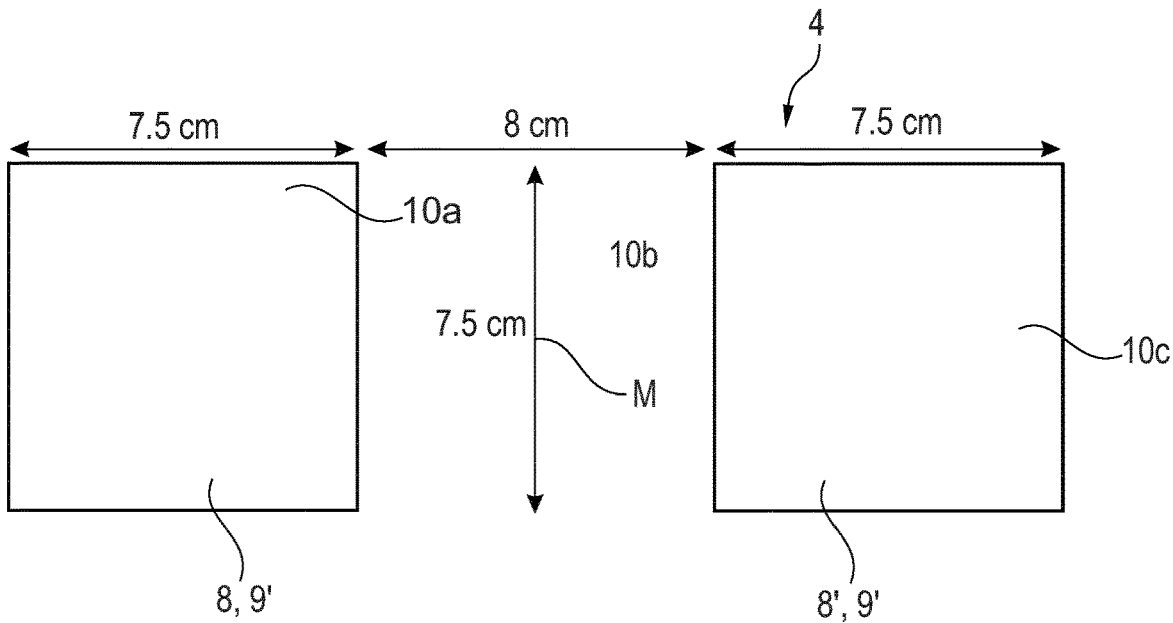
FIG. 2 shows schematically a possible embodiment of a detecting facility having a reference marking.

According to FIG. 1, a cleaning robot 1 in accordance with the invention has a self-driving, in other words autonomous, cleaning robot 2 and a charging station 3. A rechargeable battery of the cleaning robot 2 can be charged in the charging station 3 if said cleaning robot docks with and electrically contacts said charging station. The charging station 3 has a visibly arranged reference marker 4 (cf. also FIG. 2), while the cleaning robot 2 has in addition an optical detecting facility 5, by way of example a camera. By way of the detecting facility 5, the cleaning robot 2 can detect both the reference marker 4 and also an environment of the cleaning robot 2 in order by way of example to avoid obstacles. In addition to the detecting facility 5, the cleaning robot 2 also has a computing facility 6, by way of example a computer or a microprocessor that is connected in a communicating manner to the detecting facility 5 and a control facility 7 so as to control a moving process of the cleaning robot 2. By way of the control facility 7, control commands are transmitted by way of example to a drive facility by way of which the cleaning robot 2 is driven. Detecting facility, the computing facility 6 is now designed in such a manner that it performs a moving process of the cleaning robot 2 towards the charging station 3 in a distance-dependent and detection-dependent manner by means of a HOG method (histogram of oriented gradients) and a reference marker method. In accordance with the invention, the computing facility 6 consequently controls the moving process of the cleaning robot 2 towards the charging station 3 by way of the HOG method if a distance d between the cleaning robot 2 and the charging station 3 is greater than a pre-defined distance, by way of example greater than 3 meters, or the detecting facility 5 of the cleaning robot 2 does not recognize or does not detect the reference marker 4 on the charging station 3. If a distance between the cleaning robot 2 and the charging station 3 is less than or equal to the pre-defined distance, by way of example less than or equal to 3 meters, or the detecting facility 5 of the cleaning robot 2 detects the reference marker 4, then the computing facility 6 controls the moving process of the cleaning robot 2 towards the charging station 3 by way of the reference marker 4. Consequently, so as to control the moving process, the cleaning system 1 in accordance with the invention uses a combined method of a HOG method and a reference marker method.

The reference marker 4 can have by way of example two images 8, 8' (cf. FIG. 2) and/or two shapes 9, 9' which are arranged spaced apart from one another. In the case of the reference marker 4 that is illustrated in accordance with FIG. 2, this has three rectangles 10$a$, 10$b$ and 10$c$ which are arranged adjacent to one another and of which the middle rectangle 10$b$ has a different color and a different shape than the two lateral rectangles 10$a$ and 10$c$. In the specific case of FIG. 2, the middle rectangle 10$b$ is 7.5 cm high and 8 cm wide, whereas the two lateral rectangles 10$a$ and 10$c$ are each squares with sides 7.5 cm long. In addition, in the illustrated case, the middle rectangle 10$b$ is white, whereas the two lateral rectangles 10$a$ and 10$c$ are red. Consequently, the reference marker 4 that is illustrated in accordance with FIG. 2 has on the two lateral rectangles 10$a$ and 10 $c$ respectively four corner points and four edges that render possible a clear allocation in a reference marker method.

Figure 3:
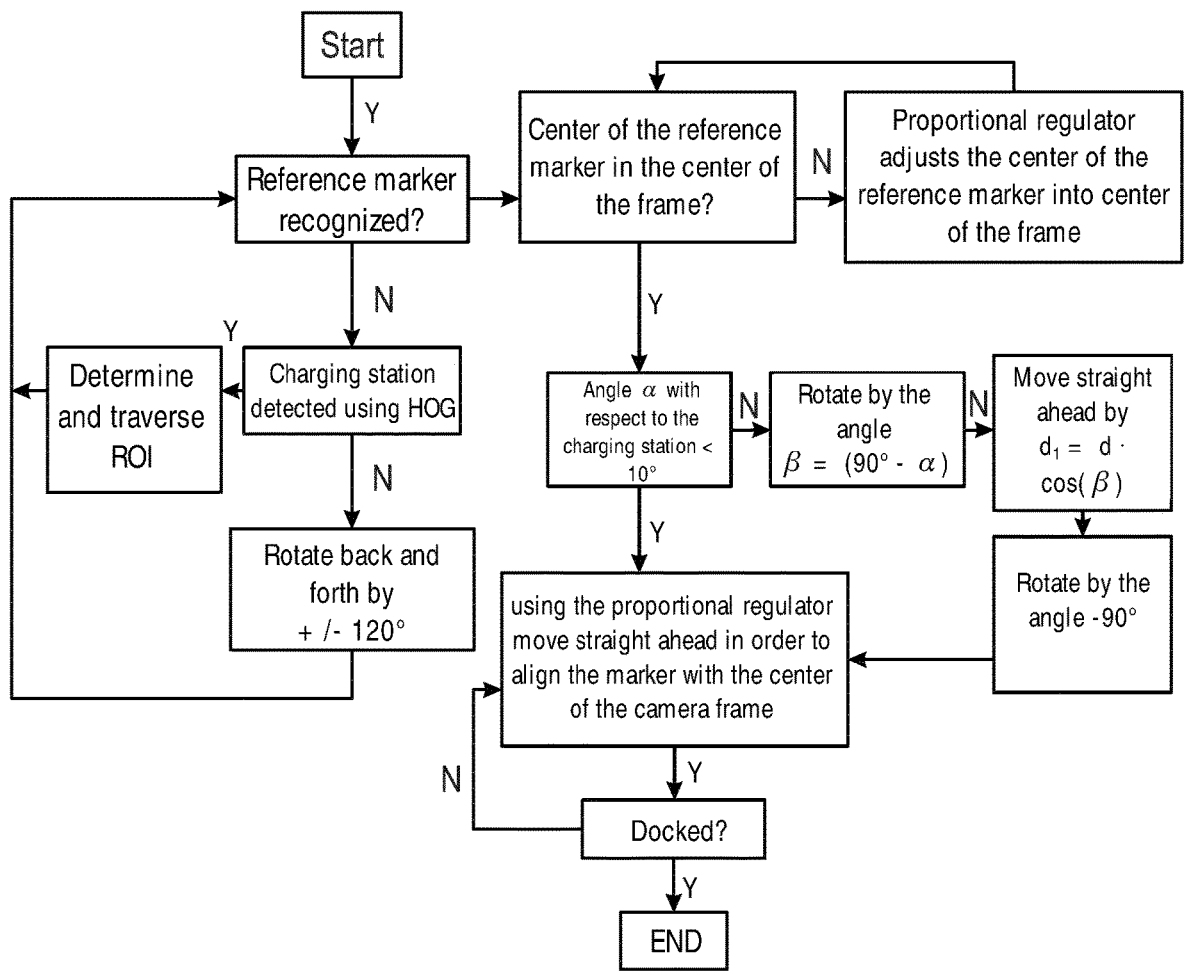
FIG. 3 shows schematically a flow diagram for performing a method in accordance with the invention for moving a self-driving cleaning robot towards a charging station.

A method of this type in accordance with the invention for moving the self-driving cleaning robot 2 to the charging station 3 is by way of example illustrated in accordance with FIG. 3 and described below.

The method in accordance with the invention is started, after which the detecting facility 5 attempts to locate the reference mark 4. If said detecting facility does not recognize the reference marker, by way of example because a distance d to the reference marker 4, in other words between the cleaning robot 2 and the charging station 3, is too large, then the charging station 3 is detected by means of the HOG method. If the charging station 3 is detected by means of the HOG method, then a region of interest (ROI) is determined and traversed after which further attempts are made to detect the reference marker 4 by means of the optical detecting facility 5. If the charging station 3 cannot be detected by means of the HOG method, then the cleaning robot 2 is rotated back and forth by plus/minus 120 degrees and a new attempt is made by means of the detecting facility 5 to detect the reference marker 4.

The latter mentioned method steps can then occur in particular if the cleaning robot 2 is located at a great distance from the charging station 3, by way of example a distance greater than 3 meters.

If the reference marker 4 is recognized by means of the detecting facility 5 of the cleaning robot 2, then the computing facility 6 controls the moving process of the cleaning robot 2 towards the charging station 3 by way of the reference marker 4. This is then the case if for example a distance between the cleaning robot 2 and the charging station 3 is less than or equal to the pre-defined distance or the detecting facility 5 detects the reference marker 4.

After the reference marker 4 is detected, the computing facility 6 calculates a distance d, coordinates of the cleaning robot 2 and an angle α of the cleaning robot 2 at a middle point M of the reference marker 4. If the angle α is now ≤10 degrees, then the control facility 7 steers the cleaning robot 2 by means of a regulator, for example a proportional regulator, directly to the charging station 3 in that the (proportional) regulator moves the cleaning robot 2 in such a manner that the middle point M of the reference marker 4 illustrates a middle point of a specified frame of a camera image. Consequently, if the center or the middle point M of the reference marker 4 does not lie in the center of the frame of the image, which is detected by the detecting facility 5, or image frame, then the (proportional) regulator adjusts the center of the reference marker 4 into the center of the frame by correcting the movement direction of the cleaning robot 2.

If the angle α that is calculated by the computing facility 6 and detected by the detecting facility 5 is greater than 10 degrees, then the cleaning robot is initially rotated in the anti-clockwise direction by an angle β=(90 degrees−α) and is subsequently moved over a distance $d_1 = d \times \cos(\beta)$. This corresponds to the point B in FIG. 1. Subsequently, the cleaning robot 2 is by way of the computing facility 5, the control facility 7 and a drive facility in the opposite direction, that in the present case it is rotated in a clockwise direction by an angle of 90 degrees and then moved over a distance $d_2 = d \times \sin(\beta)$. Thereafter, it should be possible for the cleaning robot 2 to be able to dock with the charging station 3. Should this not be the case, it would be necessary to re-align or move the cleaning robot 2.

If by way of example the angle α>10 degrees and simultaneously a distance d is less than 100 cm to the charging station 3, then the cleaning robot 2 initially moves back in order to be able to reliably perform the previously mentioned method steps and consequently a moving process.

Using the method in accordance with the invention and the cleaning system 1 in accordance with the invention it is possible in the first instance to move the cleaning robot 2 towards the charging station 3 in a precise and reliable manner by a combination of a HOG method and a reference marker method, whereby it is possible to achieve that the charging station 3 can be constructed overall in a more compact and more cost-effective manner. In addition, it is also possible in the case of greater distances or in the case of a detecting facility 5 not directly detecting the reference marker 4 to ensure a reliable moving process. In this case, it is of course clear that the HOG method by specifying or importing different images of the charging station 2 with different backgrounds and illumination situation or positions increases a self-learning effect and as a result renders it possible to improve the manner in which the cleaning robot 2 locates the charging station 3.

LIST OF REFERENCE CHARACTERS

1 Cleaning system
2 Cleaning robot
3 Charging station
4 Reference marker
5 Optical detecting facility
6 Computing facility
7 Control facility
8 Image
9 Shape
10 Rectangle

The invention claimed is:

1. A cleaning system, comprising:
a self-driving cleaning robot and a charging station for charging a rechargeable battery of said cleaning robot;
said charging station having a visibly arranged reference marker and said cleaning robot having an optical detecting facility configured for detecting said reference marker and an environment;
said cleaning robot having a computing facility, connected for communication with said detecting facility, and a controller for controlling a moving process of said cleaning robot;
said computing facility being configured to:
control the moving process of said cleaning robot towards said charging station by way of a histogram of oriented gradients when a distance d between said cleaning robot and said charging station is greater than a pre-defined distance or said detecting facility does not detect said reference marker, wherein the pre-defined distance is 3 m;
control the moving process of said cleaning robot towards said charging station by way of said reference marker when the distance d between said cleaning robot and said charging station is less than or equal to the pre-defined distance or said detecting facility detects said reference marker.

2. The cleaning system according to claim 1, wherein said reference marker has at least two images and/or shapes.

3. The cleaning system according to claim 2, wherein said reference marker has three mutually adjacent rectangles, including two lateral rectangles and a middle rectangle between said two lateral rectangles, and said middle rectangle has at least one of a different color or a different shape than said two lateral rectangles.

4. The cleaning system according to claim 3, wherein said middle rectangle is 7.5 cm high and 8 cm wide, whereas said two lateral rectangles are squares with sides 7.5 cm long and/or said middle rectangle is white, whereas said two lateral rectangles are red.

5. A method in a cleaning system, comprising:
providing the cleaning system with a self-driving cleaning robot and a charging station for the cleaning robot;
providing the charging station with a visibly arranged reference marker and providing the cleaning robot with an optical detecting facility configured for detecting the reference marker and an environment;

providing the cleaning robot with a computing facility, connected for communication with the detecting facility, and a controller for controlling the cleaning robot;

driving the self-driving cleaning robot to the charging station by:

controlling, by the computing facility, a moving process of the cleaning robot towards the charging station by way of a histogram of oriented gradients when a distance d between the cleaning robot and the charging station is greater than a pre-defined distance or the detecting facility of the cleaning robot does not detect the reference marker, wherein the pre-defined distance is 3 m;

controlling, by the computing facility, the moving process of the cleaning robot towards the charging station by way of the reference marker when the distance d between the cleaning robot and the charging station is less than or equal to the pre-defined distance or when the detecting facility detects the reference marker.

6. The method according to claim 5, which comprises calculating with the computing facility the distance d, coordinates, and an angle α of the cleaning robot with respect to a middle point of the reference marker if the detecting facility detects the reference marker.

7. The method according to claim 6, which comprises, when the angle α is less than or equal to 10° (α≤10°), steering the cleaning robot with the computing facility directly towards the charging station by a proportional controller, thereby moving the cleaning robot with the proportional controller in such a manner that the middle point of the reference marker illustrates a middle point of a specified frame of the detecting facility.

8. The method according to claim 6, which comprises, when the angle α is greater than 10° (α>10°), rotating the cleaning robot with the computing facility in a counter-clockwise direction by an angle β=(90°−α) and subsequently moving the cleaning robot over a distance $d_1 = d \times \cos(\beta)$; and rotating the cleaning robot in a clockwise direction by an angle of 90° and subsequently moving the cleaning robot over a distance $d_2 = d \times \sin(\beta)$.

9. The method according to claim 6, which comprises, when the angle α is greater than 10° (α>10°) and a distance d is less than 100 cm (d<100 cm) moving the cleaning robot with the computing facility back towards the charging station.

* * * * *